(12) United States Patent
Hirono et al.

(10) Patent No.: US 7,671,771 B2
(45) Date of Patent: *Mar. 2, 2010

(54) OPTICAL QUANTIZING UNIT AND OPTICAL A/D CONVERTER

(75) Inventors: Masatoshi Hirono, Yokohama (JP); Takahiro Suzuki, Tokyo (JP); Hideki Ito, Kawasaki (JP); Takeshi Morino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/155,174

(22) Filed: Jun. 2, 2008

(65) Prior Publication Data

US 2008/0297391 A1 Dec. 4, 2008

Related U.S. Application Data

(63) Continuation of application No. 11/525,842, filed on Sep. 25, 2006, now Pat. No. 7,403,142.

(30) Foreign Application Priority Data

Jan. 11, 2006 (JP) .......................... P2006-004214

(51) Int. Cl.
*H03M 1/00* (2006.01)
(52) U.S. Cl. ....................................... 341/137; 341/155
(58) Field of Classification Search ................. 341/137, 341/155
See application file for complete search history.

(56) References Cited

U.S. PATENT DOCUMENTS

| 4,712,089 | A | 12/1987 | Verber |
| 4,851,840 | A | 7/1989 | McAulay |
| 5,010,346 | A | 4/1991 | Hamilton et al. |
| 5,479,539 | A | 12/1995 | Goldsmith et al. |
| 6,118,396 | A | 9/2000 | Song |
| 6,118,397 | A | 9/2000 | Heflinger |
| 6,160,504 | A | 12/2000 | Fields et al. |
| 6,246,350 | B1 | 6/2001 | Yap |
| 6,326,910 | B1 | 12/2001 | Hayduk et al. |
| 6,404,535 | B1 | 6/2002 | Leight |
| 6,420,985 | B1 | 7/2002 | Toughlian et al. |
| 6,700,517 | B1 | 3/2004 | Kellar |
| 7,403,142 | B2 * | 7/2008 | Hirono et al. ................ 341/137 |
| 7,403,143 | B2 * | 7/2008 | Hirono et al. ................ 341/137 |

OTHER PUBLICATIONS

Miyoshi et al., "Simplification of All-Optical Analog-to-Digital Converter Using Split-and-Delay Technique," IEICE Technical Report (Aug. 2005), pp. 51-56.

* cited by examiner

*Primary Examiner*—Khai M Nguyen
(74) *Attorney, Agent, or Firm*—Finnegan, Henderson, Farabow, Garrett & Dunner, L.L.P.

(57) ABSTRACT

An optical quantizing unit includes an optical divider dividing $1^{st}$ optical pulses to be quantized and sending the divided $1^{st}$ optical pulses into a plurality of paths; a plurality of optical filters passing with different transmittances the divided $1^{st}$ optical pulses; and an optical threshold filter sequentially receiving the $1^{st}$ optical pulses, and sending $2^{nd}$ optical pulses when light intensities of the $1^{st}$ optical pulses are above a preset threshold value.

1 Claim, 8 Drawing Sheets

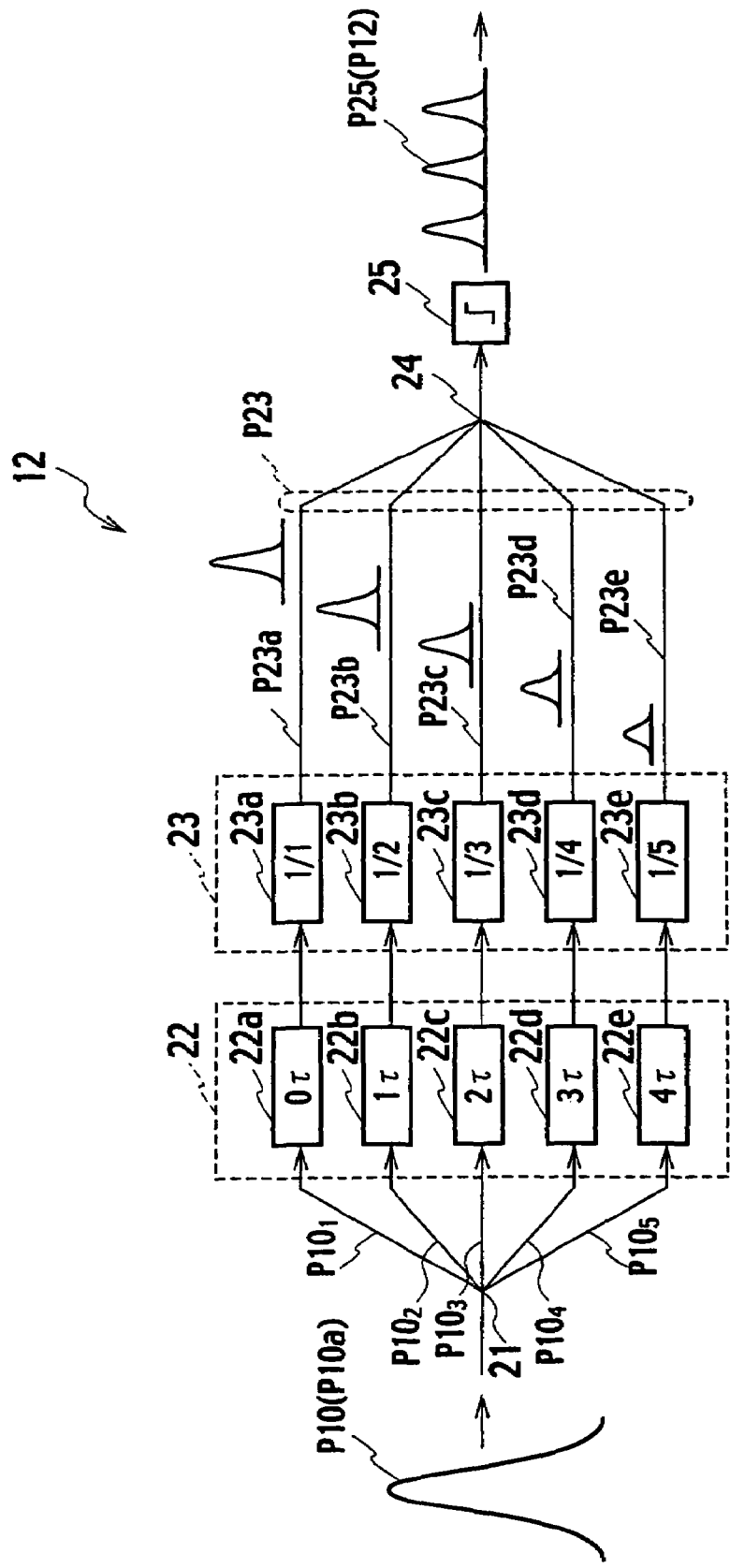

OPTICAL QUANTIZING UNIT AND OPTICAL A/D CONVERTER

This is a continuation of application Ser. No. 11/525,842, filed Sep. 25, 2006, now U.S. Pat. No. 7,403,142 which is incorporated herein by reference.

CROSS REFERENCE TO RELATED APPLICATIONS

This application is based upon and claims the benefit of the priority from prior Japanese Patent Application 2006-004214 filed on Jan. 11, 2006, the entire contents of which are incorporated by reference herein.

BACKGROUND OF THE INVENTION

1. Field of the Invention

This invention relates to an optical quantizing unit and an optical A/D converter, and more particularly relates to an optical quantizing unit which produces optical pulses whose quantities are proportional to intensities of input optical pulses, and an optical A/D converter provided with the optical quantizing unit.

2. Description of the Related Art

U.S. Pat. No. 4,712,089 discloses an optical quantizing circuit which produces optical pulses in proportion to the intensity of optical pulses.

In Reference 1, input optical pulses to be quantized are divided in accordance with the number of quantizing levels, and the optical pulses to be quantized are input into a plurality of optical threshold filters having different threshold values.

The optical threshold filters compare the optical pulses to be quantized with threshold values, and output optical pulses when the optical pulses to be quantized have light intensities above the threshold values. The number of the outputted optical pulses is proportional to intensities of optical pulses to be quantized.

However, since the foregoing optical threshold filters are large, the optical quantizing unit inevitably become bulky as a whole. Further, when a plurality of optical threshold filters are provided, the application efficiency of light will be lowered, and intensities of the input optical pulses to be quantized will be increased. Therefore, it is difficult to fabricate an economical optical quantizing unit.

BRIEF SUMMARY OF THE INVENTION

According to a first aspect of the embodiment of the invention, there is provided an optical quantizing unit which includes an optical divider dividing $1^{st}$ optical pulses to be quantized and sending the divided $1^{st}$ optical pulses to a plurality of routes; a plurality of optical filters passing with different transmittances the divided $1^{st}$ optical pulses; and an optical threshold filter sequentially receiving the $1^{st}$ optical pulses, and sending $2^{nd}$ optical pulses when light intensities of the $1^{st}$ optical pulses are above a preset threshold value.

In accordance with a second aspect, there is provided an optical A/D converter which includes an optical sampling unit which samples optical analog signals; an optical quantizing unit which quantizes the sampled optical analog signals and outputs the quantized optical pulses; and a binary converter which performs binary conversion of the quantized optical pulses. The optical quantizing unit is constituted by an optical divider which divides $1^{st}$ optical pulses to be quantized and transmits the divided $1^{st}$ optical pulses to a plurality of paths; a plurality of optical filters which transmit with different transmittances the divided $1^{st}$ optical pulses; and an optical threshold filter which sequentially receives the $1^{st}$ optical pulses from the optical filters, and outputs the quantized $2^{nd}$ optical pulses when light intensities of the $1^{st}$ optical pulses are above a preset threshold value.

BRIEF DESCRIPTION OF THE SEVERAL VIEWS OF THE DRAWINGS

FIG. 3 is a block diagram of an optical quantizing unit in the optical A/D converter of FIG. 1.

DETAILED DESCRIPTION OF THE INVENTION

First Embodiment

Figure 1:
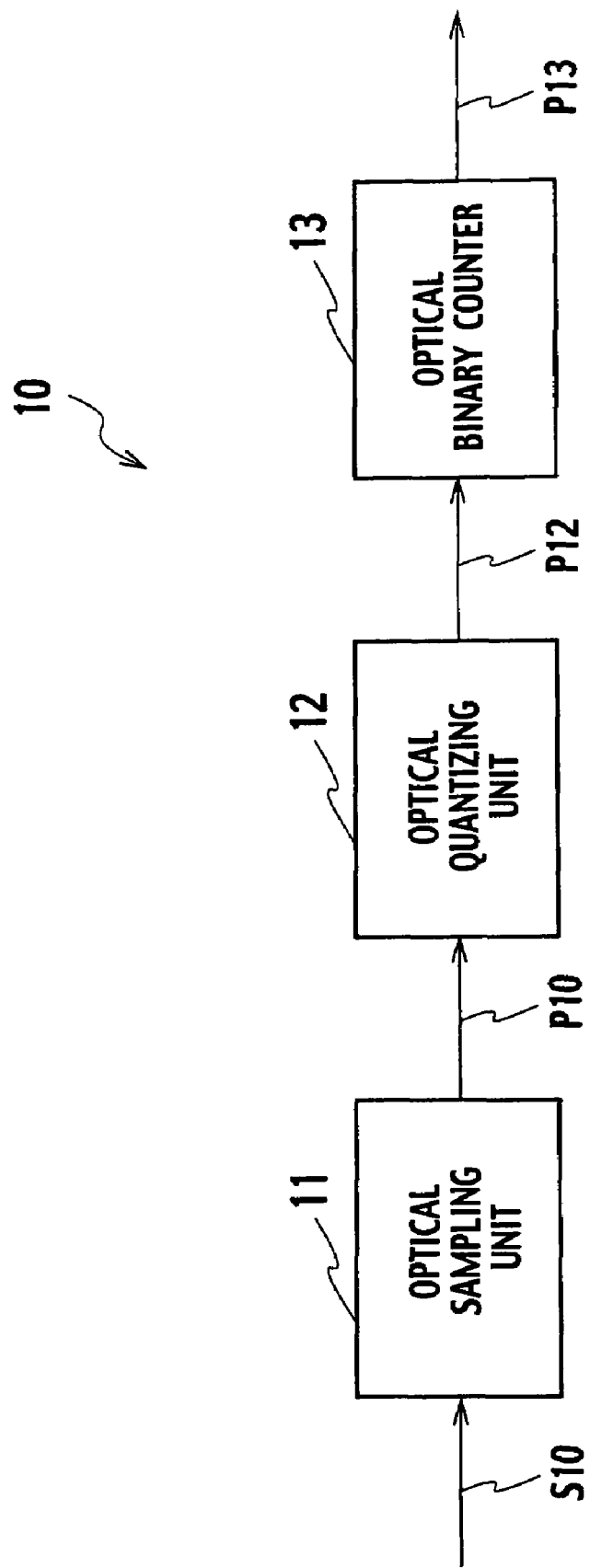
FIG. 1 is a block diagram of an optical A/D converter according to a first embodiment of the invention.
Figure 2A:
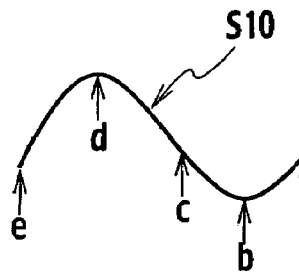
FIG. 2A, FIG. 2B, FIG. 2C and FIG. 2D show waveforms which are processed by the optical A/D converter of FIG. 1.

Referring to FIG. 1, an optical A/D (Analog/Digital) converter 10 includes an optical sampling unit 11, an optical quantizing unit 12, and an optical binary counter 13. The optical sampling unit 11 sequentially samples an optical analog signal S10 (see FIG. 2A), and converts the signal S10 into a string of optical pulses P10 (P10a, P10b, P10c, ..., shown in FIG. 2B) to be quantized. The optical quantizing unit 12 sequentially receives the optical pulses P10 to be quantized, and quantizes them into a string of quantized optical pulses P12 (P12a, P12b, P12c, ..., shown in FIG. 2C). The optical binary counter 13 sequentially receives the quantized optical pulses P12 from the optical quantizing unit 12, and converts them into coded optical binary pulses P13 (see FIG. 2D).

The optical sampling unit 11 may operate on four-wave-mixing, passes an optical analog signal having a frequency $\omega 2$ and sampling pulses having a frequency $\omega 1$ through a nonlinear medium (e.g., a dispersion shifted fiber or the like), and produces a string of analog pulses having a frequency of $2\omega 1 - \omega 2$ (whose amplitude is proportional to a signal level of a sampled optical analog signal). By the way, the frequency $\omega$, a wavelength $\lambda$ and a velocity c of light are expressed by $\omega = 2\pi c/\lambda$. The optical sampling unit 11 is not always required to operate on the four-wave-mixing.

The optical quantizing unit 12 (shown in FIG. 3) is constituted by an optical divider 21, a plurality of delay lines 22a to 22e, a plurality of optical filters 23a to 23e, an optical synthesizer 24, and an optical threshold filter 25. The optical divider 21 divides the optical pulses P10 (P10a, P10b, P10c, ...) to be quantized and direct them to a plurality of routes. The delay lines 22a to 22e delay the divided optical pulses $P10_1$ to $P10_5$ with different delay times. The optical filters 23a to 23e pass the optical pulses P23a to P23e with different transmittances. The optical synthesizer 24 synthesizes the optical pulses P23a to P23e. The optical threshold filter 25 sends output pulses P25 (quantized optical pulses P12) when the intensities of optical pulses P23a to P23e are above the threshold $P_{th}$.

In the optical quantizing unit 12, the optical divider 21 has a star coupler which may be a 1×5 star coupler of fiber or waveguide type. The optical divider 21 is oriented in order to divide one input into five outputs. Specifically, the optical divider 21 divides the optical pulses P10 (P10a, P10b, P10c, P10d, . . . ) to be quantized into the number of pulses in accordance with quantizing levels in the quantizing unit 12. It is assumed that three optical pulses P10a, P10b and P10c are sequentially received. For instance, the optical pulse P10a is divided into five levels (however, the number of quantizing levels is not always limited to five). The optical pulses P10b and P10c are similarly divided into the number of levels in accordance with the quantizing levels in the quantizing unit 12.

Thereafter, the optical divider 21 sends the divided optical pulses ($P10_1$ to $P10_5$) to a delay line array 22. The delay line array 22 includes a plurality of delay lines 22a to 22e whose waveguides have different lengths. In other words, the divided optical pulses $P10_1$ to $P10_5$ are sent to the delay lines 22a to 22e, respectively. The waveguide of the delay line 22a is shortest, while the waveguides of the delay lines 22b, 22c, 22d and 22e become longer in sequence. This means that a delay time is shortest in the delay line 22a while the delay times of the delay lines 22b, 22c, 22d and 22e become longer in sequence. In FIG. 3, "τ" denotes delay times.

The optical pulses $P10_1$, $P10_2$, $P10_3$, $P10_4$ and $P10_5$ which have been delayed in the delay line array 22 are transmitted to the optical filters 23a to 23e of the optical filter array 23. The optical filters 23a to 23e pass the received optical pulses with different transmittances. In short, the light transmittances of the optical filters 23a to 23e are selected in order to satisfy the following formula, where "$t_1$" denotes the largest transmittance, and "$t_2$" denotes a second largest transmittance.

$$\frac{1}{t_{i+2}} = \frac{2}{t_{i+1}} - \frac{1}{t_i}$$

Therefore, it is possible to adjust the light intensities of the optical pulses $P10_1$ to $P10_5$ in the linear shape. For instance, when $t_1$=1 and $t_2$=½, $t_3$ is ⅓, $t_4$ is ¼ and $t_5$ is ⅕. The optical filter 23a is placed at an output side of the delay line 22a whose delay time is shortest, and outputs the input optical pulse without reducing the light intensity. The optical filter 23b is placed at an output side of the delay line 22b whose delay time is secondly shortest, and outputs the input optical pulse by reducing the light intensity to half. The optical filter 23c is placed at an output side of the delay line 22c whose delay time is thirdly shortest, and outputs the input optical pulse by reducing the light intensity to one third. The optical filter 23d is placed at an output side of the delay line 22d whose delay time is fourthly shortest, and outputs the received optical pulse by reducing the light intensity to one fourth. The optical filter 23e is placed at an output side of the delay line 22e whose delay time is longest, and outputs the input optical pulse by reducing the light intensity to one fifth. The optical filter 23a passes the optical pulses without reducing the light intensity, which is the same as in a case where there is no optical filter. Therefore, the optical filter 23a may be omitted.

The optical pulse P23a having the largest light intensity is transmitted first of all. Thereafter, the optical pulses P23b, P23c, P23d and P23e whose light intensities are sequentially reduced are transmitted in succession. As for $t_i$ and $t_{i+1}$, it is not always required that $t_1$ is 1 and $t_2$ is ½, but they may be 1.0 and 0.4, respectively, or may be any values.

Figure 4:
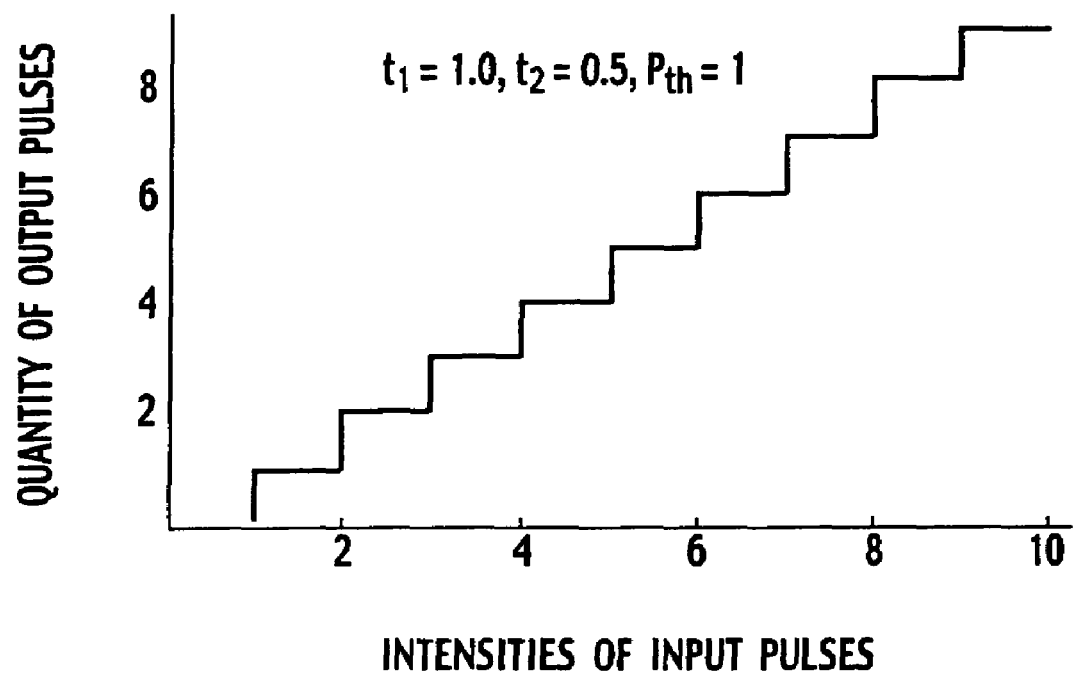
FIG. 4 is a graph showing the relationship between the intensities of input pulses and the number of output pulses in the optical quantizing unit of FIG. 3.

FIG. 4 shows the relationship between intensities of the input pulses and quantity of the output pulses when $t_1$ is 1 and $t_2$ is 0.5, and a threshold value $P_{th}$ (to be described later) of the optical threshold filter 25 is 1.

The optical synthesizer 24 is placed downstream of the optical filter array 23, and synthesizes outputs of the optical filters 23a to 23e. The optical synthesizer 24 is provided with a star coupler, which is of a fiber or waveguide type 1×5 star coupler, and is oriented in order to synthesize the five inputs into one output. Specifically, the optical synthesizer 24 synthesizes the outputs of the optical filters 23a to 23e, and sequentially sends the optical pulses P23a to P23e to the optical threshold filter 25 at specified timings. The specified timings depend upon the delay times of the delay lines 22a to 22e of the delay line array 22.

As described above, the optical divider 21 sequentially divides the optical pulses P10 (P10a, P10b, P10c, . . . ); the divided optical pulses P10 are transmitted to the optical filters 23a to 23e via the delay lines 22a to 22e; the optical filters 23a to 23e pass the divided optical pulses P10 with the different transmittances to produce the optical pulses P23a to P23e having the foregoing light intensities; and the optical synthesizer 24 periodically and sequentially transmits the optical pulses P23a to P23e to the optical threshold filter 25 at different timings.

The optical threshold filter 25 compares the received optical pulses P23a to P23e with the preset threshold value $P_{th}$, and transmits an output pulse P25 for an optical pulse whose light intensity is above the preset threshold value $P_{th}$. The output pulse P25 serves as the quantized optical pulse P12 shown in FIG. 1.

Figure 5:
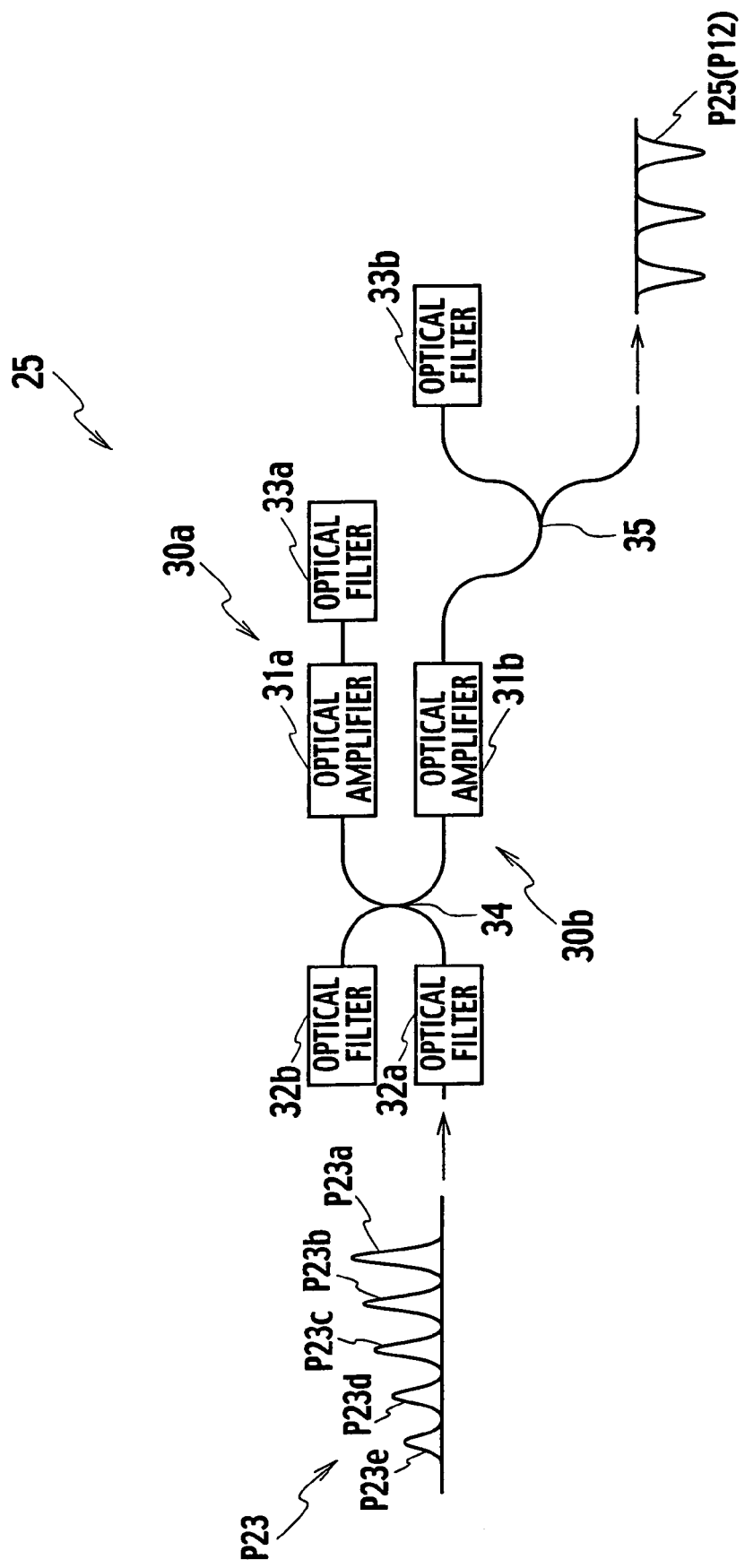
FIG. 5 is a block diagram of an optical threshold filter of the optical quantizing unit of FIG. 3.

Referring to FIG. 5, in the optical threshold filter 25, a first laser oscillator 30a includes a first optical amplifier 31a and optical filters 32a, 33a. A first optical amplifier 31a is placed between optical filters 32a and 33a. A second laser oscillator 30b includes a second optical amplifier 31b and optical filters 32b, 33b. A second optical amplifier 31b is placed between optical filters 32b and 33b.

The optical amplifiers 31a and 31b are preferably erbium-doped fiber amplifiers or semiconductor optical amplifiers (SOA). The optical threshold filter 25 is constituted by the laser oscillators, and is very robust since it does not operate in response to optical phases.

The optical filters 32a, 33a, 32b and 33b include FBGs (Fiber Bragg Gratings). Each FBG is a diffraction grating whose flexibility varies periodically, and is placed at a core of an optical fiber. These optical filters reflect only lights having predetermined wavelengths in accordance with cycles of the diffraction gratings and flexibilities of the optical fibers, but pass the remaining lights.

In this embodiment, the optical filters 32a and 33a of the first laser oscillator 30a are constituted by FBGs which reflect lights having wavelengths slightly different from the wavelength of the optical pulses P10 to be quantized. This enables the first laser oscillator 30a to oscillate in response to the lights having the preset wavelengths.

In contrast to the first laser oscillator 30a, the optical filters 32b and 33b of the second laser oscillator 30b are constituted by FBGs which reflect lights having wavelengths slightly different from those of the optical pulses P10 to be quantized and reflected wavelengths of optical filters 32a and 33a. This enables the second laser oscillator 30b to oscillate in response to lights having the preset wavelengths.

The optical amplifiers 31a and 31b are preferably semiconductor optical amplifiers for a 1550 nm band used for optical communications. The optical pulses P10 to be quantized are inputted into the optical threshold filter 25 have a 1552.52 nm band. The optical filters 32a and 33a of the first laser oscillator 30a may be constituted by FBGs whose center wavelength is 1549.32 nm. The optical filters 32b and 33b of the second laser oscillator 30b may be constituted by FBGs whose center wavelength is 1558.98 nm. Alternatively, different wavelength bands may be used.

The first and second laser oscillators 30a and 30b are joined by an optical coupler 34, so that laser outputs produced by one laser oscillator are inputted into the other laser oscillator. In this example, 60% of lights which are outputted from the optical amplifier 31a of the first laser oscillator 30a is inputted into the optical filter 32a while 40% of the lights is inputted into the optical amplifier 31b of the second laser oscillator 30b. Alternatively, the splitting ratio of the optical coupler 34 may be 50/50.

An optical coupler 35 is placed between the optical amplifier 31b and the optical filter 33b. The output pulse P25 is outputted via the optical coupler 35. In this example, the optical coupler 35 has the splitting ratio of 50/50. Different splitting ratios may be used.

The first laser oscillator 30a has an output intensity for ripping carriers off from the optical amplifier 31b of the second laser oscillator 30b, thereby stopping the second laser oscillator 30b. On the contrary, the second laser oscillator 30b does not have an output intensity for stopping the first laser oscillator 30a. Therefore, only the first laser oscillator 30a is designed to oscillate at the time of default.

The following describes how the optical synthesizer 24 periodically and sequentially transmits the optical pulses P23a to P23e to the optical threshold filter 25. The optical synthesizer 24 outputs the first pulse P23a, which is received by the optical filter 32a of the first laser oscillator 30a. As described above, the optical filter 32a is designed to reflect lights whose wavelength is slightly different from the wavelengths of the optical pulses P10 to be quantized (i.e., the wavelength of the optical pulses P23a to P23e). Therefore, the optical filter 32a passes the optical pulse P23a from the optical synthesizer 24. The optical pulse P23a is inputted into the optical amplifier 31a via the optical coupler 34.

Since there is a slight difference between a reflective wavelength causing the laser oscillation and the wavelength of the optical pulse P23a, the optical pulse P23a rips carriers off from the optical amplifier 31a, which lowers the laser output of the first laser oscillator 30a. If the laser output of the first laser oscillator 30a is below the minimum value for completely suppressing the operation of the second laser oscillator 30b, the second laser oscillator 30b starts laser oscillation. Even if the laser oscillation by the second laser oscillator 30b is slight, a slight laser output is sent into the optical amplifier 31a, which further weakens a laser output of the first laser oscillator 30a. The weaker the laser output of the first laser oscillator 30a, the stronger the laser output of the second laser oscillator 30b. The lowering of the laser oscillation in the first laser oscillator 30a and the increase of the laser output of the second laser oscillator 30b are repeated, so that the flip-flop state of the first and second laser oscillators 30a and 30b is instantly switched over at an accelerated speed. The laser output of the second laser oscillator 30b is transmitted as the output pulse P25 (the quantized optical pulse P12) via the optical coupler 35.

In the optical threshold filter 25, the laser output of the first laser oscillator 30a is reduced in accordance with the light intensity of the optical pulse P23a from the optical synthesizer 24. When the foregoing laser output is below a minimum light intensity necessary for completely suppressing the oscillation of the second laser oscillator 30b, the states of the first and second laser oscillators 30a and 30b are switched over. Thereafter, the second laser oscillator 30b starts oscillation, and produces the output pulse P25. As described above, the output pulse P25 is produced by the oscillation of the second laser oscillator, this is effective in signal regeneration and assuring a high contrast.

In the flip-flop constituted by the first and second laser oscillators 30a and 30b, when the second laser oscillator 30b is in operation, the first laser oscillator 30a remains inactive. The first laser oscillator 30a remains completely inactive under the following conditions. The laser output of the second laser oscillator 30b in the default state is very weak compared to the laser output of the first laser oscillator 30a in the default state. In this state, it is impossible to completely suppress the oscillation of the first laser oscillator 30a. In short, when the second laser oscillator 30b is oscillating, the first laser oscillator 30a is prevented from oscillating because of a sum of the laser output of the second laser oscillator 30b and the optical pulse arriving from an external unit (the optical synthesizer 24). In this case, the optical pulse P23a arrives at the first laser oscillator 30a from the optical synthesizer 24, so that an amount of lights incident on the first laser oscillator 30a is increased. If the laser output of the first laser oscillator 30a is slightly below the minimum necessary light quantity for suppressing the laser output of the second laser oscillator 30b, the oscillating state of the first or second laser oscillator 30a or 30b is changed. In this state, when the sum of the light quantity of the optical pulse incident on the first laser oscillator 30a and the laser output of the second laser oscillator 30b becomes slightly below the minimum light amount for completely suppressing the laser output of the second laser oscillator 30b, the oscillation state of the first or second laser oscillator 30a or 30b is switched over. During the change of the oscillation state, when the sum of the light amount of the optical pulse incident onto the first laser oscillator 30a and the laser output of the second laser oscillator 30b in the default state is a necessary minimum light amount for completely suppressing the oscillation of the first laser oscillator 30a.

When the first optical pulse P23a arrives at the optical threshold filter 25 from the optical synthesizer 24, the flip-flop state is changed. While the second laser oscillator 30b transmits the output pulse P25, the quantity of light arriving at the optical threshold filter 25 is reduced at the trailing edge of the first optical pulse P23a. If the sum of the light quantity of the optical pulse P23a arriving at the first laser oscillator 30a and the laser output of the second laser oscillator 30b in the default state is below the foregoing minimum light quantity, the first laser oscillator 30a starts oscillating even if the second laser oscillator 30b is oscillating. This means that the flip-flop state of the first and second laser oscillators 30a and 30b is changed.

In the optical threshold filter 25, the first laser oscillator 30a has the output intensity for ripping the carriers off from the optical amplifier 31b of the second laser oscillator 30b in order to stop the oscillation of the second laser oscillator 30b. On the contrary, the second laser oscillator 30b does not have such an output intensity. Therefore, the optical pulse is inputted into the first laser oscillator 30a, which enables the switch-over of the state of the flip-flop of the first and second laser oscillators 30a and 30b.

As described above, the optical threshold filter 25 is designed to sequentially receive the optical pulses P23a to P23e from the optical synthesizer 24. The optical pulses P23a to P23e have the light intensities depending upon the light intensities of the optical pulses P10 to be quantized. Specifically, the first optical pulse P23a has the largest light intensity, and the remaining optical pulses P23b to P23e have the light intensities which are gradually reduced. It is assumed that the threshold value $P_{th}$ denotes the intensity of external lights (the optical pulses) for the first laser oscillator 30a to send the laser output to the second laser oscillator 30b via the optical coupler 35 and to completely suppress the oscillation of the second laser oscillator 30b. The flip-flop of the optical threshold filter 25 is operated in response to any one of the optical pulses P23a to P23e which has the light intensity above the threshold value $P_{th}$, so that the output pulses P25 will be outputted. Refer to FIG. 4. On the contrary, when an optical pulse whose light intensity is below the threshold value $P_{th}$, the flip-flop remains unchanged (i.e., the second laser oscillator 30b does not oscillate), so that no output pulse P25 will be transmitted. The optical quantizing unit 12 can produce the number of output pulses P25 (quantized optical pulses P12) in accordance with the light intensity of each optical pulse P10 (P10a, P10b, P10c, . . . ) to be quantized.

The quantized optical pulses P12 from the optical quantizing unit 12 are sent to the optical binary counter 13 (shown in FIG. 1). The optical binary counter 13 includes an assortment of optical logics, and performs the binary conversion of the quantized optical pulses P12 into encoded optical pulses P13. The encoded optical pulses P13 are outputted as 3-bit pulses as shown in FIG. 2D.

Figure 2B:
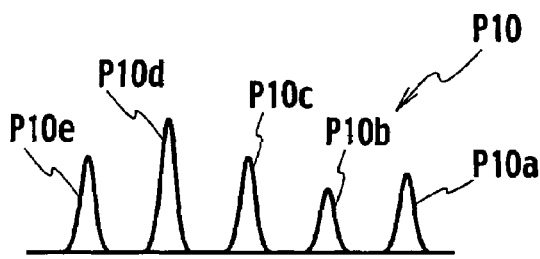

The optical sampling unit 11 of the optical A/D converter 10 receives the analog optical signals S10 (see FIG. 2A), sequentially samples them with preset clock frequencies, and produces the optical pulses P10 to be quantized (see FIG. 2B). The optical pulses P10 to be quantized (i.e., the optical pulses P10a to P10e) have signal levels corresponding to the light intensities at preset sampling points a to e. The following describe how the five optical pulses P10a to P10e to be quantized are transmitted.

Figure 2C:
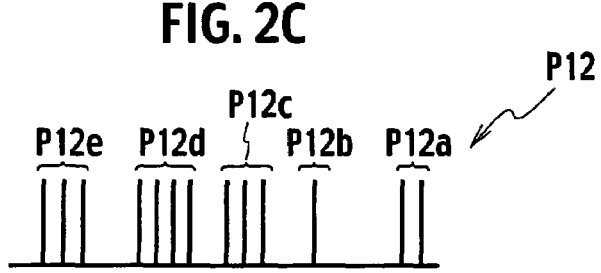
Figure 2D:
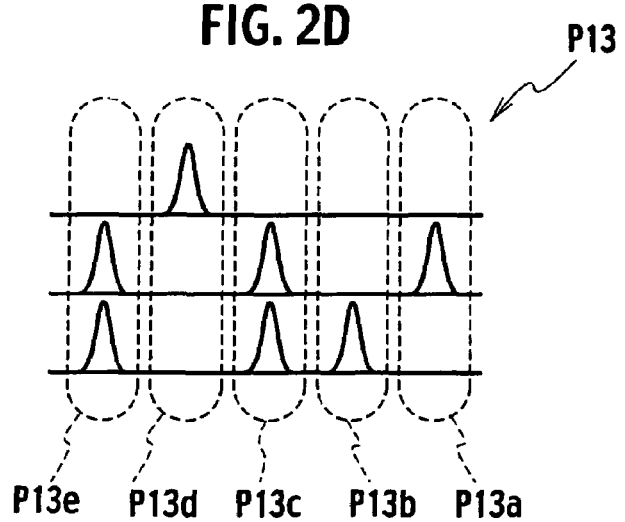

The optical pulses P10a to P10e to be quantized are sampled by the optical sampling unit 11, and are sequentially transmitted to the optical quantizing unit 12, which quantizes the received optical pulses P10a to P10e, and produces quantized optical pulses P12 (see FIG. 2C). The number of the quantized optical pulses P12 (P12a to P12e) corresponds to the light intensities of the each optical pulses P10a to P10e to be quantized. The quantized optical pulses P12a to P12e are transmitted to the optical binary counter 13, which performs the binary conversion of the received optical pulses P12, and produces coded optical pulses P13 (see FIG. 2D). The coded optical pulses P13 (i.e., P13a to P13e) are assigned binary 3-bit codes denoting light intensities 1 to 4. A 3-bit code 010 denotes the intensity 2, and is assigned to the optical pulse P13a which is coded on the basis of the quantized optical pulse P12a. The 3-bit 001 denotes the intensity 1, and is assigned to the optical pulse P13b which is coded on the basis of the quantized optical pulse P12b. A 3-bit code 011 denotes the intensity 3, and is assigned to the optical pulse P13c which is coded on the basis of the quantized optical pulse P12c. A 3-bit code 100 denotes the intensity 4, and is assigned to the optical pulse P13d which is coded on the basis of the quantized optical pulse P12d. A 3-bit code 011 denotes the intensity 3, and is assigned to the optical pulse P13e which is coded on the basis of the quantized optical pulse P12e. The analog optical analog signals S10 are converted into the pulses P13a, P13b, P13c, P13d and P13e, and are outputted in succession by the optical A/D converter 10.

As described above, the optical divider 21 sequentially divides the optical pulses P10 (P10a, P10b, P10c, . . . ); the divided optical pulses P10 are transmitted to the optical filters 23a to 23e via the delay lines 22a to 22e; a plurality of optical pulses P23a to P23e have light intensities which are gradually reduced when one of the optical pulses (e.g., P10a) is assumed to have a maximum light intensity; the optical filters 23a to 23e pass the divided optical pulses P10 with the different transmittances to produce the optical pulses P23a to P23e having the foregoing light intensities; and the optical synthesizer 24 periodically and sequentially transmits the optical pulses P23a to P23e to the optical threshold filter 25 at different timings.

Only when receiving one of the optical pulses P23a to P23e which have the light intensity above the threshold value $P_{th}$, the optical threshold filter 25 sends the output pulses P25 (i.e., quantized optical pulses P12). The number of quantized optical pulses P12 depends upon the light intensity of the optical pulses P10 to be quantized.

According to the invention, the optical pulses $P10_1$ to $P10_5$ to be quantized are divided on the basis of the number of quantizing levels, and are transmitted to the optical threshold filter 25 via the optical filters 23a to 23e having the different transmittance. This enables one optical threshold filter 25 to quantize the optical pulses, which is effective in simplifying the optical quantizing unit 12 and the optical A/D converter 10 including the optical quantizing unit 12.

Other Embodiments

In the first embodiment of the optical quantizing unit 12, the optical filter array 23 is placed downstream of the delay line array 22. Alternatively, the optical filter array 23 may be placed upstream of the delay line array 22.

Further, the laser oscillator 30a (or 30b) includes the optical amplifier 31a (or 31b) which is placed between the optical filters 32a and 33a (or 32b and 33b). Alternatively, the laser oscillators may be of a circular type or a micro-ring type that does not need any optical filters, and so on.

Figure 6:
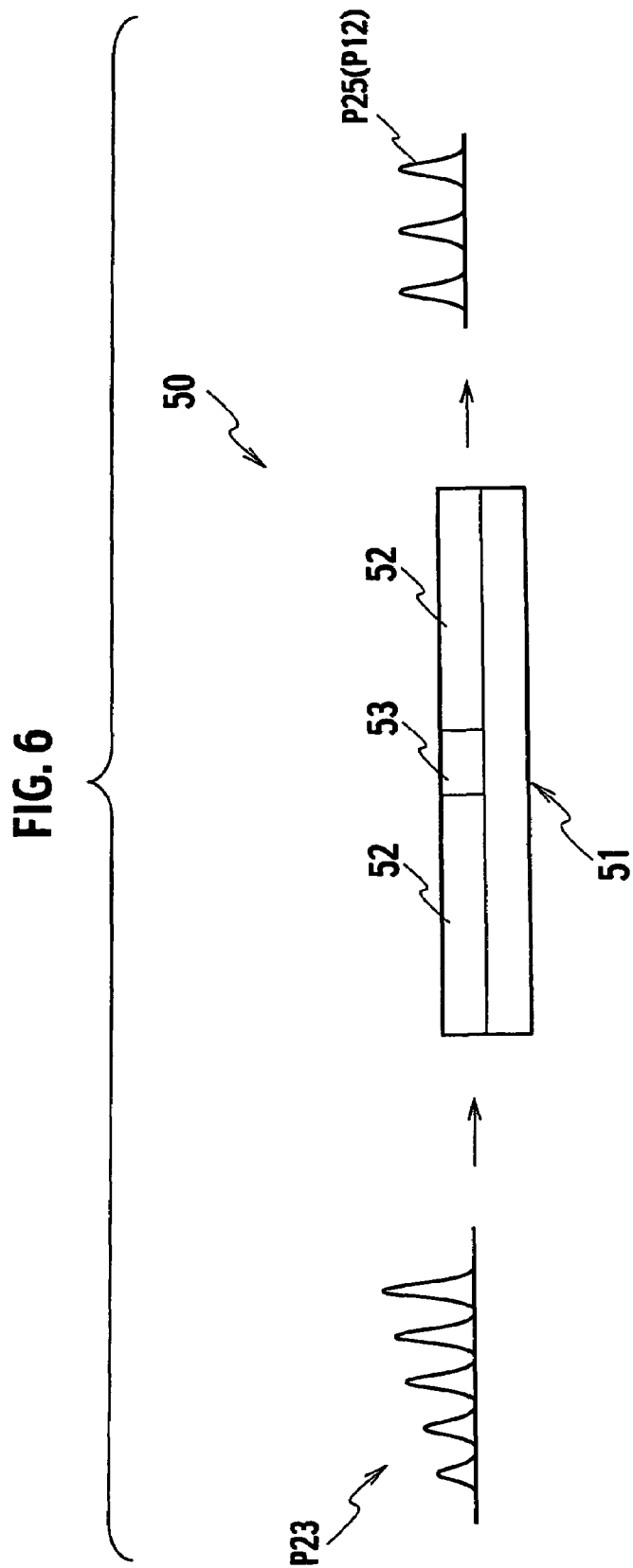
FIG. 6 schematically shows an optical threshold filter using bistable semiconductor lasers according to a further embodiment of the invention.

Still further, the optical threshold filter 25 may be replaced with an optical threshold filter 50 including a bistable semiconductor laser 51 as shown in FIG. 6. The bistable semiconductor laser 51 includes a saturable absorber 53 sandwiched between gain areas 52. By setting a value of a current applied to the lasers, the bistable semiconductor laser 51 oscillates lasers only when intensities of lights arriving from an external unit are above a preset value. The use of the optical threshold filter 50 is effective in further simplifying the optical quantizing unit 12.

Figure 7:
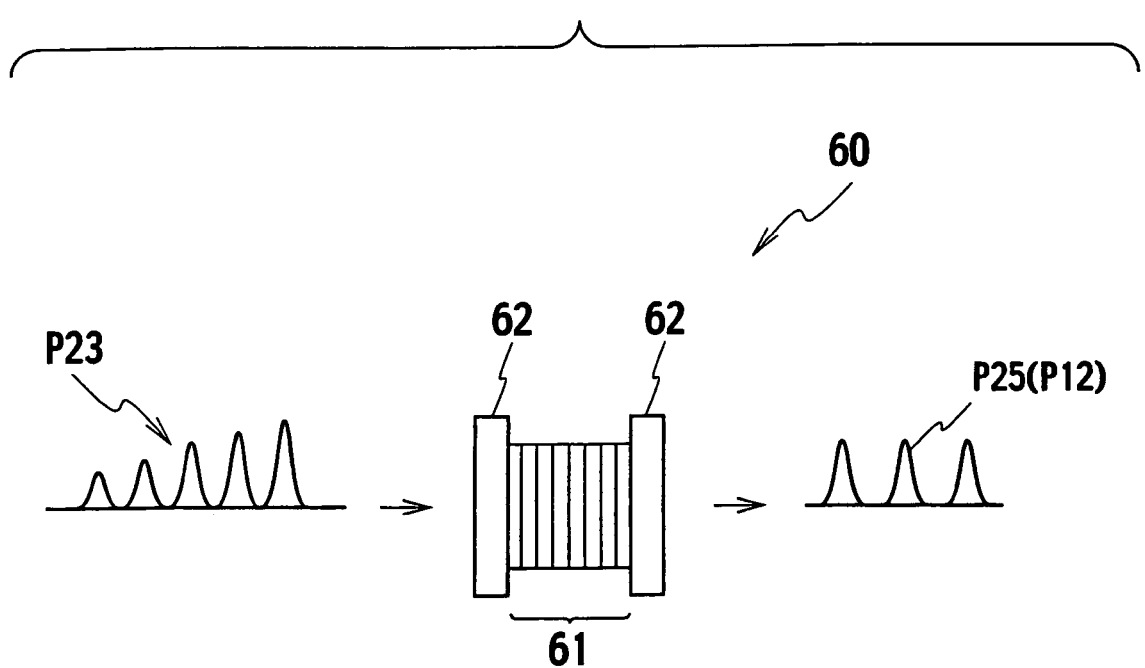
FIG. 7 schematically shows an optical threshold filter using a nonlinear etalon.

An optical threshold filter 60 constituted by a nonlinear etalon may be used in place of the optical threshold filter 25, as shown in FIG. 7. With the optical threshold filter 60, a nonlinear media 61 (e.g., made of GaAs/GaAlAs superlattice film) is placed between multi-layer mirrors 62 in order to constitute the resonator. This structure enables the transmittance of the optical threshold filter 60 to have very strong non-linear characteristics in response to an increase of intensity of incident light.

Figure 8:
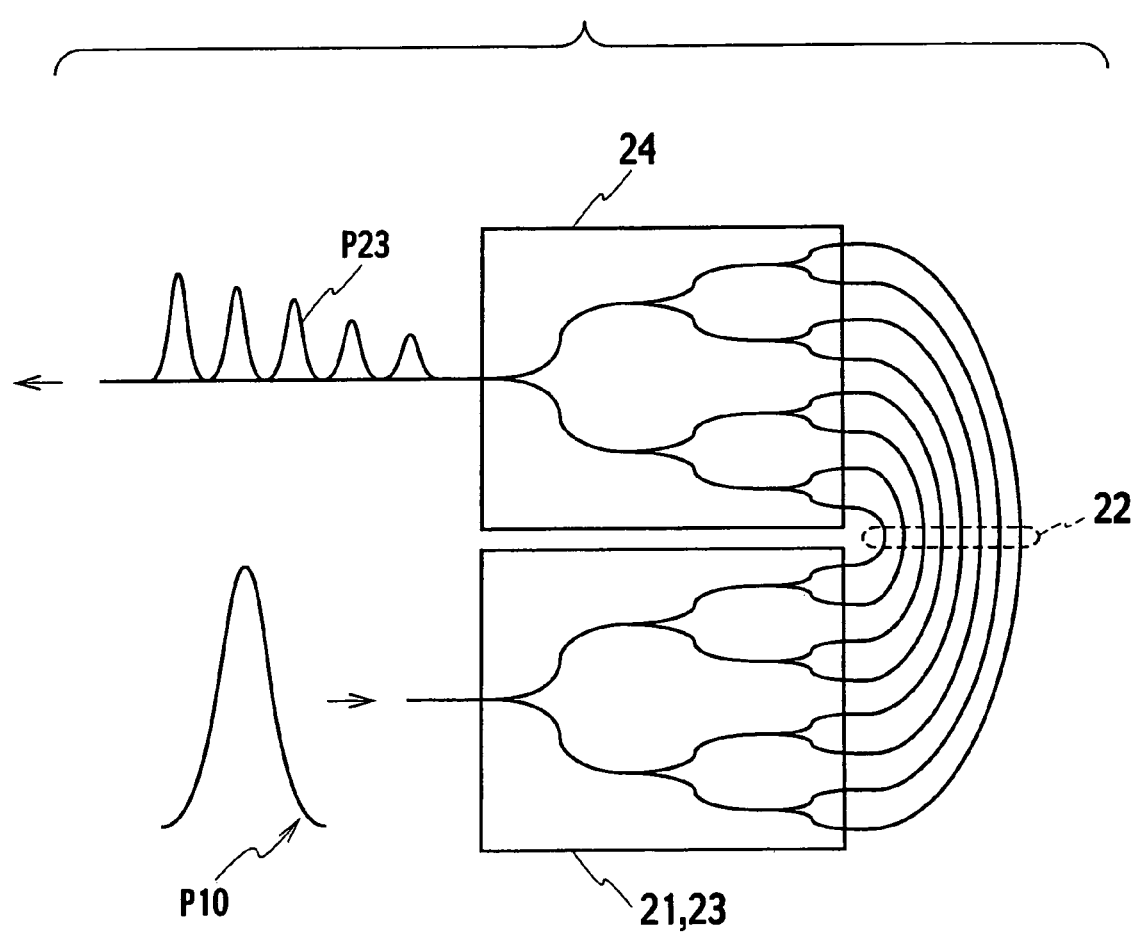
FIG. 8 schematically shows an example of an optical quantizing unit which is integrated using a optical waveguide.

Referring to FIG. 8, the optical quantizing unit 12 may be integrated using a wave guide. In FIG. 8, a depiction of the optical threshold filter 25 is abbreviated, and a light path extends between the optical divider 21 and the optical synthesizer 24 is depicted. Further, the number of quantizing levels is 8. The optical pulse P10 to be quantized is inputted into the optical divider 21. The optical divider 21 may be a Y-branch type or a gap type coupler using evanescent wave coupling, and so on. By adjusting a splitting ratio of the coupler, the optical divider 21 also serves as the light transmitting filter array 23. The divided optical pulses P10 to be quantized are transmitted via a curved light path having inner and outer path, so that each one of the optical pulses P23 is output at different delay time. The optical pulses P10 are transmitted to the optical synthesizer 24 via the delay line array 22, so that a string of optical pulses P23 to be inputted to the optical threshold filter 25 will be produced. In the embodiment shown in FIG. 8, it is assumed that the optical divider 21 also functions as the optical filter array 23, and each light path has the same coupling ratio at the optical synthesizer 24. Alternatively, the functions of the optical filter array 23 may be carried out by the optical divider 21 and the optical synthesizer 24, and so on. Alternatively, different arrangement of light path may be used. The foregoing light integrating circuit may be realized using the optical lithographic process. This is effective in downsizing the light path between the input section and the optical threshold filter 25.

What is claimed is:

1. A method for optical analog-to-digital conversion, comprising:

sequentially sampling an optical analog signal;

converting the optical analog signal into a string of first optical pulses;

dividing the first optical pulses to be quantized, in accordance with a number of quantizing levels;

sending each of the divided first optical pulses to each of a plurality of delay lines, respectively, so as to delay the divided first optical pulses in the delay lines by different delay times;

transmitting each of the divided first optical pulses, which have been delayed in the delay lines, to each of a plurality of optical filters, respectively, the optical filters passing the divided first optical pulses with different transmittances;

synthesizing each of the divided first optical pulses passed through each of the optical filters;

sending a string of quantized second optical pulses when light intensities of the divided first optical pulses passed through the optical filters are above a preset threshold value; and performing binary conversion of the quantized second optical pulses.

* * * * *